United States Patent
Simioni et al.

(10) Patent No.: US 12,001,523 B2
(45) Date of Patent: Jun. 4, 2024

(54) SOFTWARE ACCESS THROUGH HETEROGENEOUS ENCRYPTION

(71) Applicant: International Business Machines Corporation, Armonk, NY (US)

(72) Inventors: Marco Simioni, Dublin (IE); Stefano Braghin, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 17/036,577

(22) Filed: Sep. 29, 2020

(65) Prior Publication Data

US 2022/0100822 A1    Mar. 31, 2022

(51) Int. Cl.
| | |
|---|---|
| *G06F 21/10* | (2013.01) |
| *G06F 9/445* | (2018.01) |
| *G06F 21/60* | (2013.01) |
| *H04L 9/08* | (2006.01) |

(52) U.S. Cl.
CPC ........ *G06F 21/105* (2013.01); *G06F 9/44521* (2013.01); *G06F 21/602* (2013.01); *H04L 9/0819* (2013.01); *G06F 21/107* (2023.08)

(58) Field of Classification Search
CPC .......... G06F 21/10; G06F 21/12; G06F 21/14; G06F 21/105; G06F 21/602; G06F 2221/0751; G06F 2221/0753; G06F 2221/0757; G06F 9/44521; H04L 9/0819; H04L 9/0863
See application file for complete search history.

(56) References Cited

U.S. PATENT DOCUMENTS

| | | | |
|---|---|---|---|
| 5,563,946 | A | 10/1996 | Cooper et al. |
| 5,598,470 | A | 1/1997 | Cooper et al. |
| 6,006,190 | A | 12/1999 | Baena-Arnaiz et al. |
| 6,052,780 | A | 4/2000 | Glover |
| 6,460,140 | B1 * | 10/2002 | Schoch .................. G06F 21/10 726/28 |

(Continued)

FOREIGN PATENT DOCUMENTS

| | | |
|---|---|---|
| CN | 1877595 A | 12/2006 |
| CN | 1863038 A | 10/2010 |

(Continued)

OTHER PUBLICATIONS

Top-Notch Protection with Translocated Execution, WIBU Systems, 2017.*

(Continued)

*Primary Examiner* — Minh Dinh
(74) *Attorney, Agent, or Firm* — Scott S. Dobson

(57) ABSTRACT

A first copy of a heterogeneous program payload is provided to a first computing device. The heterogeneous program payload contains an unencrypted component and a set of one or more encrypted components. The set of encrypted components corresponding to a set of one or more programs. The unencrypted component of the heterogeneous program payload includes loader program code configured to receive a first license key. The loader program code is configured to, in response to receiving the first license key, perform a decryption action against the set of encrypted components of the heterogeneous program payload.

20 Claims, 6 Drawing Sheets

(56) References Cited

U.S. PATENT DOCUMENTS

| | | | |
|---|---|---|---|
| 6,920,567 B1* | 7/2005 | Doherty | G06F 21/105 |
| | | | 713/168 |
| 7,734,550 B1* | 6/2010 | Bennett | G06F 21/105 |
| | | | 705/57 |
| 7,840,487 B2 | 11/2010 | Hatano et al. | |
| 2001/0056539 A1 | 12/2001 | Pavlin et al. | |
| 2002/0077986 A1* | 6/2002 | Kobata | H04L 63/10 |
| | | | 705/52 |
| 2002/0136405 A1* | 9/2002 | Hori | G06Q 20/1235 |
| | | | 380/203 |
| 2004/0093505 A1* | 5/2004 | Hatakeyama | G06F 21/12 |
| | | | 713/189 |
| 2007/0271191 A1* | 11/2007 | Torrubia-Saez | G06F 21/10 |
| | | | 705/59 |
| 2008/0082446 A1* | 4/2008 | Hicks | G06F 21/10 |
| | | | 705/51 |
| 2008/0313743 A1* | 12/2008 | Chan | G06F 21/10 |
| | | | 726/28 |
| 2009/0080658 A1 | 3/2009 | Waters et al. | |
| 2009/0232304 A1* | 9/2009 | King | G06F 21/125 |
| | | | 380/210 |
| 2012/0260094 A1 | 10/2012 | Asim et al. | |
| 2013/0151861 A1* | 6/2013 | Gan | G06F 21/125 |
| | | | 713/189 |
| 2014/0195824 A1* | 7/2014 | Lu | G06F 21/123 |
| | | | 713/190 |
| 2015/0121073 A1* | 4/2015 | Wajs | H04L 63/10 |
| | | | 713/168 |

FOREIGN PATENT DOCUMENTS

| | | |
|---|---|---|
| CN | 103856481 A | 6/2014 |
| CN | 108388439 A | 8/2018 |
| CN | 110998571 A | 4/2020 |
| WO | 2001001316 A2 | 1/2001 |

OTHER PUBLICATIONS

Bethencourt, J., et al., "Ciphertext-Policy Attribute-Based Encryption", In 2007 IEEE Symposium on Security and Privacy (SP '07), 321-34, 2007.

Huang, Qinlong, et al., "Attribute Based DRM Scheme with Dynamic Usage Control in Cloud Computing," China Communications 11, No. 4, 2014, pp. 50-63.

Goyal, V., et al., "Attribute-Based Encryption for Fine-Grained Access Control of Encrypted Data", 28 pages, In Proceedings of the 13th ACM Conference on Computer and Communications Security—CCS '06, 89-98. Alexandria, Virginia, USA: ACM Press, 2006.

Serengil, Sefik. "Protecting Java Codes: Encrypted Class Loader." Sefik Ilkin Serengil (blog), Apr. 4, 2017.

Mell, P. et al., "The NIST Definition of Cloud Computing", Recommendations of the National Institute of Standards and Technology, NIST Special Publication 800-145, 7 pages, Sep. 2011.

Oracle, "Class ClassLoader," https://docs.oracle.com/javase/7/docs/api/java/lang/ClassLoader.html, printed Apr. 20, 2023, 18 pgs.

\* cited by examiner

SOFTWARE ACCESS THROUGH HETEROGENEOUS ENCRYPTION

BACKGROUND

The present disclosure relates to software access, and more specifically, to providing access to various programs of software through encryption.

Software may be provided to one or more parties through a software distribution mechanism such as physical copies or network access to software. It remains a technical and security issue to control access to software only by authorized parties.

SUMMARY

According to embodiments, disclosed are a method, system, and computer program product.

A first copy of a heterogeneous program payload is provided to a first computing device. The heterogeneous program payload contains an unencrypted component and a set of one or more encrypted components. The set of encrypted components corresponding to a set of one or more programs. The unencrypted component of the heterogeneous program payload includes loader program code configured to receive a first license key. The loader program code is configured to, in response to receiving the first license key, perform a decryption action against the set of encrypted components of the heterogeneous program payload.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
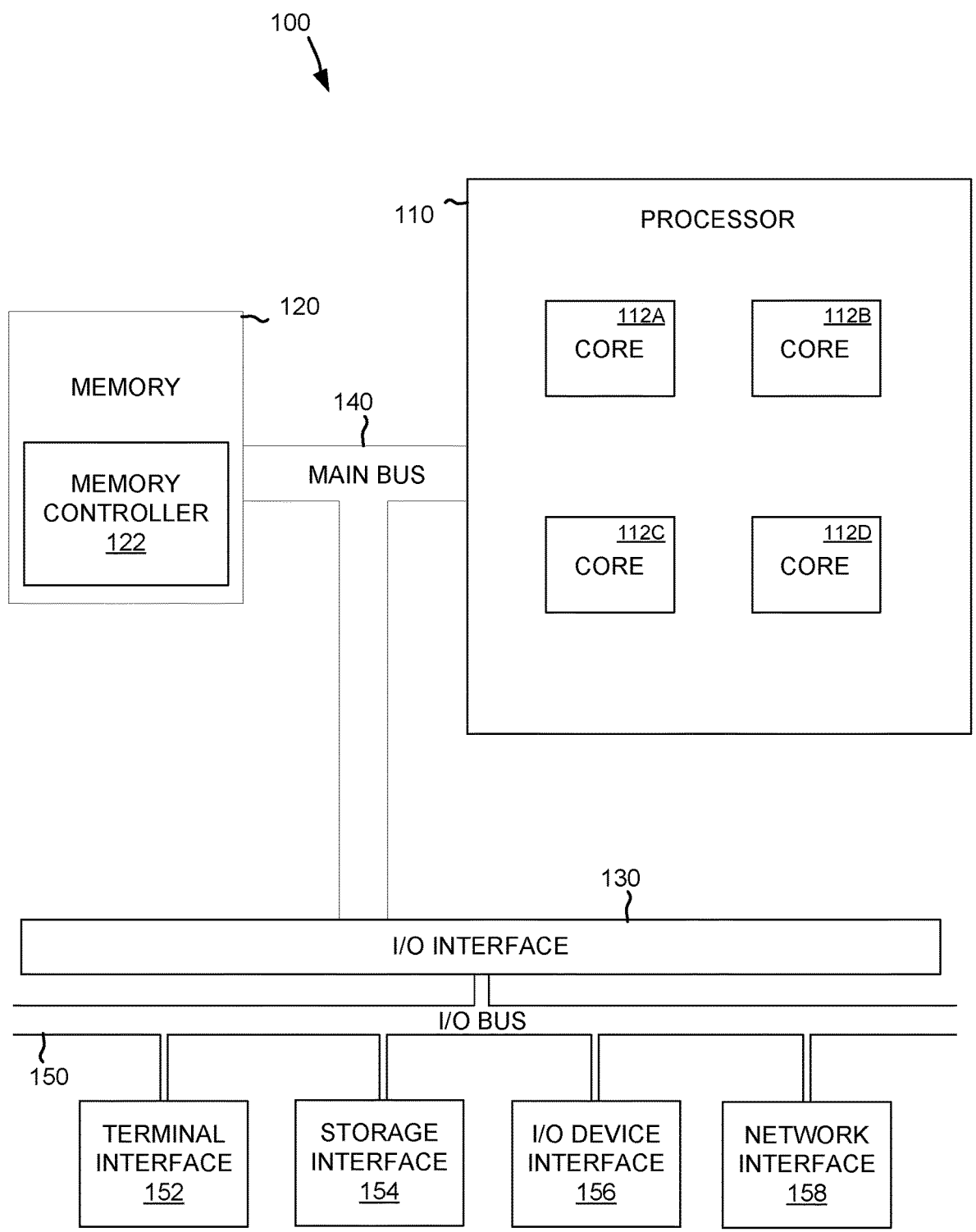
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to software access; more particular aspects relate to providing access to various programs of software through encryption. While the present disclosure is not necessarily limited to such applications, various aspects of the disclosure may be appreciated through a discussion of various examples using this context.

Software is a core portion of operating computers. Software may be a collection of programs. Each program of software may come in the form of an executable files configured to perform a plurality of operations for users. For example, a word processor may be a kind of software configured to receive input from a user to generate a textual document. Software may come in the form of differently configured versions or variants of executable code configured to perform various programs or operations for users. For example, an image editor may include a first configuration that has a subset of 1,110 features. A second configuration of the image editor may include a full set of over 3,000 features. Software may come in the form of a suite of related or unrelated programs. For example, a productivity suite may include a word processor and a presentation creator. The word processor may include a first plurality of features that are able to operate independently. The presentation creator may include a second plurality of features that are able to operate independently. Both the word processor and the presentation creator may include additional interrelated features such as the ability to export or import drawings, text, or other elements between the word processor and the presentation creator.

The creation of software is costly, as numerous individuals may be employed in the creation and maintenance of software. For example, developers, engineers, testers and the like may be focused on the creation and maintenance of the, in some cases, hundreds or thousands of programs that make up a given piece of software. The enforcement of software in its various forms is a continuing challenge for software creators. Several approaches have been taken to attempt to secure software and to provide access to the myriad of features, components, programs, variants, and other forms of software. The challenge may be complicated as software creators are attempting to create quality software and similarly provide access to clients that are granted access to the software.

Further, the control of software may be a significant security issue. For example, third parties may tamper with software and may be able to access the different programs that make up a given software. The tampering may be malicious, in that viruses or information harvesting techniques may be employed. The malicious tampering or other access to the software may become a huge technical problem. For example, malicious tampering of software may cause the software to no longer successfully operate or may cause data loss.

One approach to securing software is to generate a unique version of a binary for every purchaser of software. Specifically, a software provider may compile, build, or otherwise generate a first software executable for a first client of the software. The software provider may further generate a second software executable for a second client of the software. Generating custom versions of software for each user may have drawbacks. For example, each version created may create complexity, in that each version may include duplicate lines of code or additional logic. The added complexity may further increase the memory footprint or processing cycles required to successfully execute the software. If only one or two different clients are desirous of a version of software, it might be possible to create customized versions of the software. Quickly, however, it may become impractical or impossible to create a version of software for each user as users of software may be in the tens or hundreds or more. Further, with the customizations and version updates of software, it can quickly become quite arduous to maintain the software. For example, some clients may desire various updates and as bugs are found each version of the software may need updating. Instead of updating a single collection of software, each version of software for each client may need to be maintained. Additionally, it may consume additional memory and processing power to generate each version of a software collection and to successfully test and debug each version of software.

Another approach to securing software is a license string-based software distribution. In the license string-based software distribution, a creator of the software generates an unencrypted string (e.g., a key string; a series of letters, numbers, and symbols; a license file) for each client of the software. Specifically, the software may ship with every version, component, feature, or other relevant variant bundled into a payload (e.g., a distributable version of the software). The software may also include the capability to accept the license string read the values of the license string and determine the various variants of the software that are permitted access by the client. For example, a first user may have a first license string that permits access to a first variant of the software, such as features two, five, and seven of twelve possible variants. In another example, a second user may have a second license string that permits access to a second variant of the software, such as features one, two, three, five, and seven of twelve possible variants.

Each license string may include one or more embedded properties, characters, values or other relevant attributes. The embedded attributes may correspond to the various variants of the software. For example, a first attributes in the license string may correspond to a first software variant, and a second attributes in the license string may correspond to a second software variant. The software may include logic or code configured to accept the license string, read and process the various attributes, and responsively grant access to the variants of the software.

The license string-based approach may have additional drawbacks. The software may be subject to debugging or other attacks to determine the attributes of the license string. For example, a malicious third party may execute the software in a debugger, and during runtime the software may be monitored. The logic in the software that controls the access to the various components, features, configurations or programs of the software may be monitored to determine what particular flag, key, attribute, or value is responsible or corresponds to the various configurations. For example, a malicious third party may monitor program execution of the software and determine that an attribute in the fourth position of a license string corresponds to the ability to granting permission to execute a first program of the software. The license string-based approach may also be reverse engineered. For example, a malicious third party may decompile the software and may determine from the decompiled source code the logic of the access control program in the software. In another example, a malicious third party may monitor a memory space of the software as it is executed by a processor. While monitoring the memory spaces, the malicious third party may be able to determine the various attributes that correspond to access to various programs of the software. Once the various attributes of the value are determined, it may be trivial to share or distribute these variants to other parties. For example, a malicious third party may share on the Internet a license string with values that grant access to every program of the software.

Another drawback is that through de-compilation or other malicious techniques it may be possible to identify the various components or programs that are being access controlled and extract them for use. For example, a malicious third party may perform a deconstruction technique to retrieve or access the various programs that make up the software. Once the malicious third party has access to the various programs, the third party may recompile or create a new version of the software that does not have any license string-based access control logic. This new version of the software may be executable by the malicious third party without any license string or other access control.

Software creators may attempt to make these malicious techniques more difficult. For example, software creators may attempt to create more complicated algorithms that perform various steps to obfuscate or make observation or interception of the programs that grant access to the various components of the software. The more complicated algorithms may be successful only under limited circumstances. For example, the more complicated algorithms of access control programs may include the use of large amounts of memory or many processing cycles. These may be beneficial only on computers with large amounts of memory, such as mainframe servers or super computers. Increasingly, software is executed on computers with more limited resources that cannot perform the complicated algorithms. For example, a smartphone may not be able to perform, because of a lack of random-access memory (RAM), the complicated algorithm associated with access control of the other programs of the software. In another example, an embedded processor in an internet of things (IoT) device, may be able to perform the complicated algorithms after processing for days or weeks making the security impractical for use on the IoT device.

Another approach to software security may be a network-based software security technique. In the network-based technique, the software connects through a network (e.g., the Internet) to a central server for verification that the client is permitted to operate the software. In the network-based technique, the software may only operate while it receives a signal from the central server. This network-based software security technique has many additional drawbacks. First, the technique may be falsely mimicked by a third party. For example, a malicious third party may monitor the network traffic from a copy of the software as it executes on a given client and communicates with the central server. The signals and other relevant network traffic between may be recorded or the logic of verification may be reverse engineered through the monitoring. The malicious third party may generate similar signals responsive to the software and may falsely indicate to the software that it is the central server. Second, the network-based technique may be resource intensive. For example, a software creator may expend significant resources on owning and operating the various components of the central server and the network bandwidth associated with making the central server available to all the clients.

Third, the network-based technique may be unreliable. Specifically, due to a central server outage, or network availability issue, the ability of a given client to authenticate may be comprised. For example, a user may have smartphone and a copy of the software; the copy of the software may be configured to communicate with the central server to verify the security of the software to execute. If the smartphone loses network connectivity, even accidentally, the copy of the software may no longer execute as the access control is no longer available. Fourth, a network-based technique may not technically be possible in some practical situations. Specifically, some clients of the software may operate computers that are air-gapped system. An air-gapped system may be a system that is not communicatively coupled to any other computers. An air-gapped system may be required for a particular client. For example, a client may for increased security operate a system in a particular industry (e.g., financial, health, defense), that has a security or privacy requirement. The client may, for secure operation, not communicatively connect to any other computers and may perform processing without a network connection. Without a network connection, a network-based technique may not successfully verify one or more programs and the software may not be operable.

Heterogeneous encrypted software security (HESS) may perform with one or more advantages and features in comparison to other forms of securing software. HESS may operate, in part, by encrypting one or more programs that constitute software into a set of one or more encrypted components; the set of one or more encrypted components may be combined with an unencrypted component to form a heterogeneous program payload. For example, programs may be one or more program code files, such as from an interpreted language, arranged in one or more folders and compressed into a program package (e.g., Java program code in a JAR file). In another example, one or more source code files, such as from a compiled language, may be compiled together into a series of binary values of a program executable. In either example, a portion of the programs that make up the payload may be encrypted with a first encryption process. For example, portions of the payload could be encrypted with symmetric encryption algorithms such as AES-128 or higher key length, or with asymmetric encryption algorithms such as RSA-2048 or ECDSA-224 or higher key length, or with attribute based encryption schemes such as a key-policy attribute-based encryption scheme (KP-ABE) or a KP-ABE with constant size ciphertext.

Upon encryption, the heterogeneous program payload may have a set of one or more encrypted components that correspond to the one or more programs. The encryption process may be directed only to a portion of the components (e.g., the set of one or more programs). Specifically, another program, or programs, may remain unencrypted in the heterogeneous program payload. In some embodiments, a program such as a loader program may remain an unencrypted component of the heterogeneous program payload. For example, a program and any related or supported libraries or runtimes may remain a series of unencrypted bits in a binary executable; the executable may also include a series of encrypted bits that include the set of encrypted components. In another example, a program distributable, such as a JAR file, may have one or more code files and folders that correspond to the unencrypted portion of the heterogeneous program payload.

The heterogeneous program payload of the HESS may operate in conjunction with a key, such as a license key. In detail, the heterogeneous program payload may be distributed, together or separately with a key, to one or more computing systems. In some embodiments, the HESS may be in the form of the heterogeneous program payload and a plurality of keys. Specifically, a key may be generated for each potential client machine that is configured to operate a copy of the heterogeneous program payload. Each key may include one or more encrypted program attributes that correspond to the various programs in the heterogeneous program payload. For example, a first key may include thirty alphanumeric characters that are an encrypted form of attributes. The encrypted program attributes may be one or more, letters, characters, symbols and the like that represent an encrypted form of the program attributes that grant permission to access a subset of the set of programs that are encrypted in the set of encrypted components.

Each key may be different than any other key. Specifically, each key of the HESS may be constructed in such a way that the set of one or more encrypted program attributes is different for each key. Stated another way, two keys that grant the same permissions to the heterogeneous program payload do not share encrypted program attributes. For example, a first key may include one or more program attributes that permit operation of only a first program of the set of programs of a heterogeneous program payload. A second key may include the same one or more program attributes that also permit operation of only the first program. The first key may be encrypted such that one or more program attributes are in the form of a first set of one or more encrypted program attributes. The second key may also be encrypted such that the one or more program attributes are also in the form of encrypted program attributes, but are in the form of a second set of one or more encrypted program attributes. By inspection, it may not be determinable, knowable, or otherwise ascertainable to determine the program attributes, as only the encrypted program attributes may be observable.

The unencrypted component of the heterogeneous program payload may contain code configured to operate with and provide access to the set of encrypted components that form the rest of the payload. Specifically, the unencrypted component of the heterogeneous program payload may be configured as a loader program code ("loader"). The loader of the heterogeneous program payload of the HESS may be configured to receive the key and perform one or more decryption techniques. The decryption techniques of the heterogeneous program payload may be self-decrypting techniques. Specifically, the loader program of the heterogeneous program payload may be configured to accept one or more commands directed towards the set of encrypted components. For example, a user may initiate a request to perform execution of a first program that is encrypted in a first encrypted component of the one or more components. The user may operate by providing input to perform operation of the program to the loader. For example, the HESS may be configured to protect a productivity suite that comes in the form of software including a set of encrypted components including a text editor program and an image editor program. The user may begin operation of the HESS by sending a command to execute the text editor program to the loader.

The loader program code may be configured to receive the key and perform a decryption action on the first encrypted component. In detail, the loader may be configured to receive a key, perform a decryption action on the key and determine the validity of the key to access the program stored in an encrypted component of the heterogeneous program payload. For example, if the key contains an encrypted program attribute that, upon decryption by the loader, contains a program attribute corresponding to a requested program, the load may be configured to decrypt the program and load the program into a primary memory for execution. In another example, if the key contains an encrypted program attribute that, upon decryption by the loader, does not contain a program attribute that corresponds to a requested program, the loader may be configured to deny execution of an encrypted component that contains the program.

The heterogeneous program payload may be technically advantageous to other forms of key and executable distribution. Specifically, the values of the keys of the HESS may be resistant to malicious attacks. First, a HESS may only operate on keys that include encrypted program attributes, while license string-based techniques may operate on unencrypted values. A malicious third party may not be able to read one or more program attributes that are encrypted in the encrypted program attributes of the key. The loader may be configured only to decrypt a specific program that corresponds to an encrypted program attribute, without specifically generating an unencrypted program attribute. For example, the loader may operate only by taking as programmatic input the key and the request for execution of a first program in the form of a program execution instruction of the first program. The output of the loader may only be the execution of the first program, but may not include the unencrypted program attribute that corresponds to the first program.

Second, the loader program may operate with reduced resources comparted to other techniques. Specifically, a simpler form of calculations and decryption algorithms may be performed by the loader than other techniques, such as license string-based security techniques. For example, the decryption techniques may rely on a complex set of processes, or a dedicated set of circuits or encrypted elements. The specialized decryption processes of other techniques may be limited to only a smartphone or other portable computing device that has the specific hardware or significant processing power. Conversely, the decryption process of the loader may be a process that operates with relatively low-resource usages such as a computer process that uses only a few kilobytes of primary memory and executes only using a few dozen processing cycles.

Third, the HESS may perform decryption while being resilient to malicious third-party observation or debugging. For example, the loader program code may be decompiled or debugged, but the decryption technique of the loader may be one that does not reveal the program attributes. The loader may operate by performing a decryption action that is unobservable. For example, the code decrypted by the loader program may still be a form of encrypted code, similarly to what techniques described as "secure" or "secret" code execution. In some embodiments, Homomorphic Encryption techniques could be used such that the encrypted payload can still be executed, while still preventing an attacker from observing the code. In some embodiments, limited operations may be able to be observed, but the operations performed by the loader may not at any point present, reveal, or otherwise permit access to the unencrypted program attributes. For example, the loader program steps may only reveal a pointer, reference, or other indication of a section or portion of the set of encrypted components, but may not refer to, disclose, or otherwise reveal the actual programs stored in the encrypted components. In some embodiments, the loader code may not include any access-control logic. The loader code may not include any program code that indicates or selects a particular component that should be decrypted. In some embodiments, the license key may store, in an encrypted form such as the encrypted program attributes, a direction, pointer, or other relevant reference to a particular program. The operation of decryption may yield the pointer or reference, unencrypted from the encrypted program attributes of the license key, to the particular programs.

As a result, the loader of the heterogeneous program payload may never reveal or otherwise store in plaintext a copy of all the unencrypted programs or any access-control or program attributes that grant permission to the programs stored in the encrypted components. Further, the loader may only decrypt a portion of the encrypted components. For example, a first heterogeneous program payload includes a set of three encrypted components and an unencrypted component that includes loader program code for the set. Upon receiving a first license key that grants access to the first encrypted component, only the first encrypted component may be decrypted into a secure portion of primary memory. The second and third encrypted components may not be unencrypted; and, upon receiving only the first license key, may not ever be decrypted by the loader. This fine-grain approach to decryption may prevent unauthorized accessing or modification of the other encrypted components. Consequently, as other components of software are never decrypted or any access control logic is not present, there is no possibility to decompile, reverse engine, or otherwise view observe or obtain the programs that are not decrypted.

Fourth, the HESS may operate on an air-gapped machine. The heterogeneous program payload may be partially self-decrypting. Specifically, the loader program code of the heterogeneous program payload may operate without needing a network connection. The loader of the heterogeneous program payload may operate without communicating to other computers. The loader may operate with only access to input regarding which programs (stored in the set of encrypted components) and access to a license key.

Fifth, the HESS may be relatively simple to maintain. Specifically, the heterogeneous program payload may contain all components, features, and other programs in a variety of configurations for distribution in a single payload. For example, a first license key may include an encrypted program attribute that permits only a first encrypted component to be decrypted and executed. In another example, a second license key may include a plurality of encrypted program attributes that permit a plurality of encrypted components to be decrypted and executed. If a new version is to be created, then the software creator may only need to maintain a single heterogeneous program payload for every particular client and the variety of features or variants may be controlled only by a combination of the license key and the loader program code stored in the unencrypted component.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted)

that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100 including but not limited to the memory 120, the processor 110, and the I/O interface 130 may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
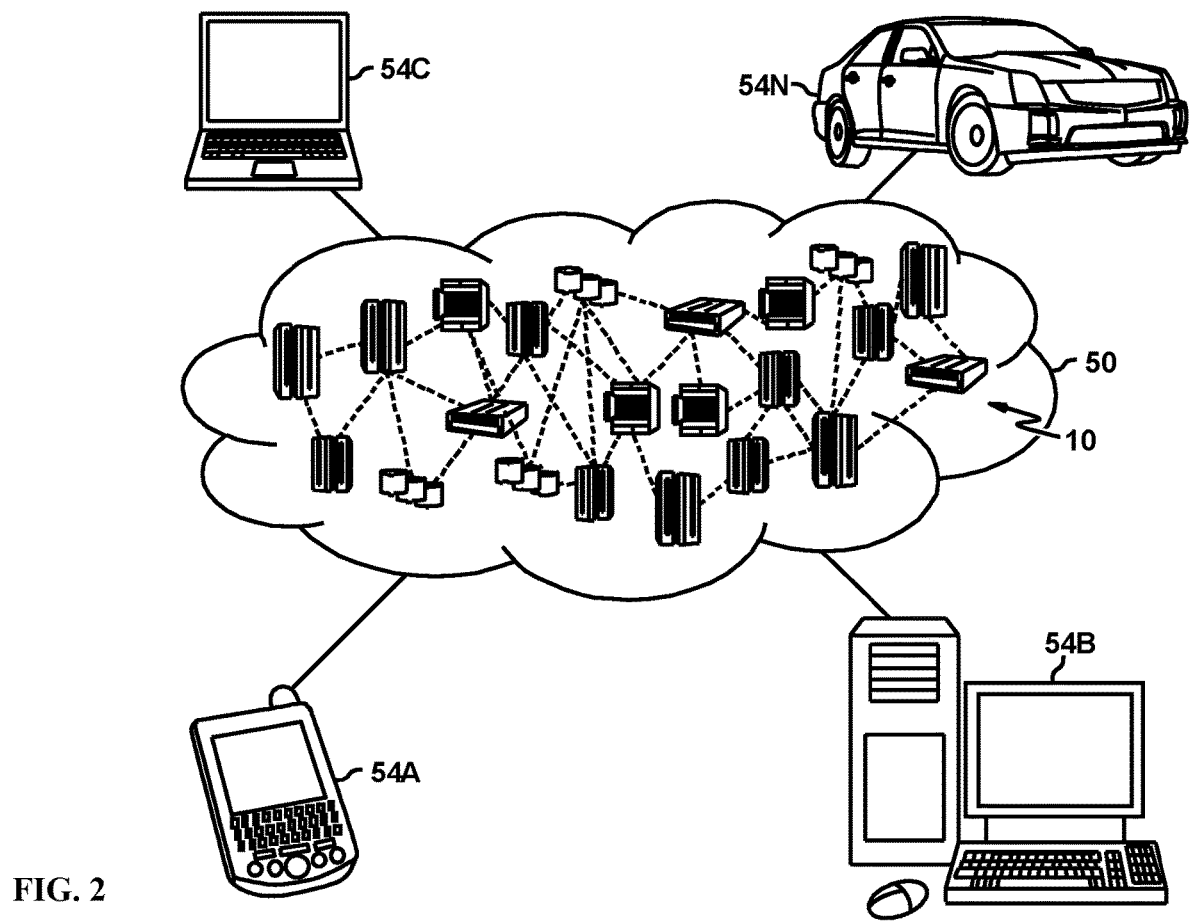
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
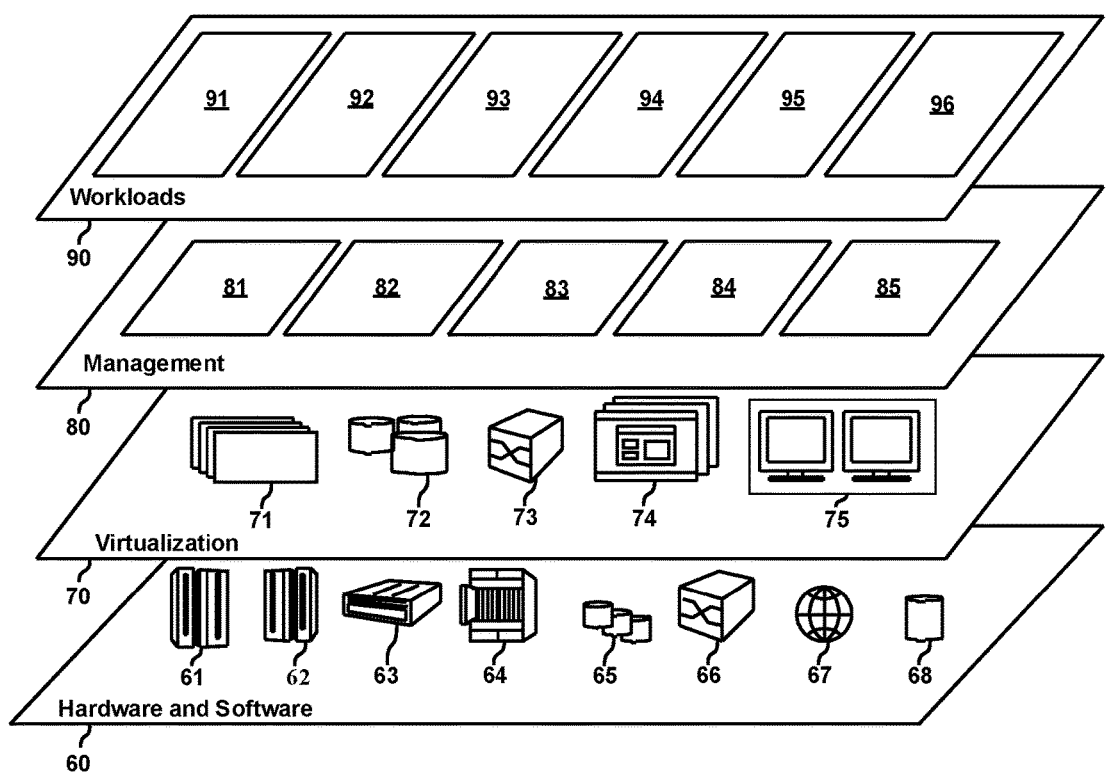
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an HESS 96.

Figure 4:
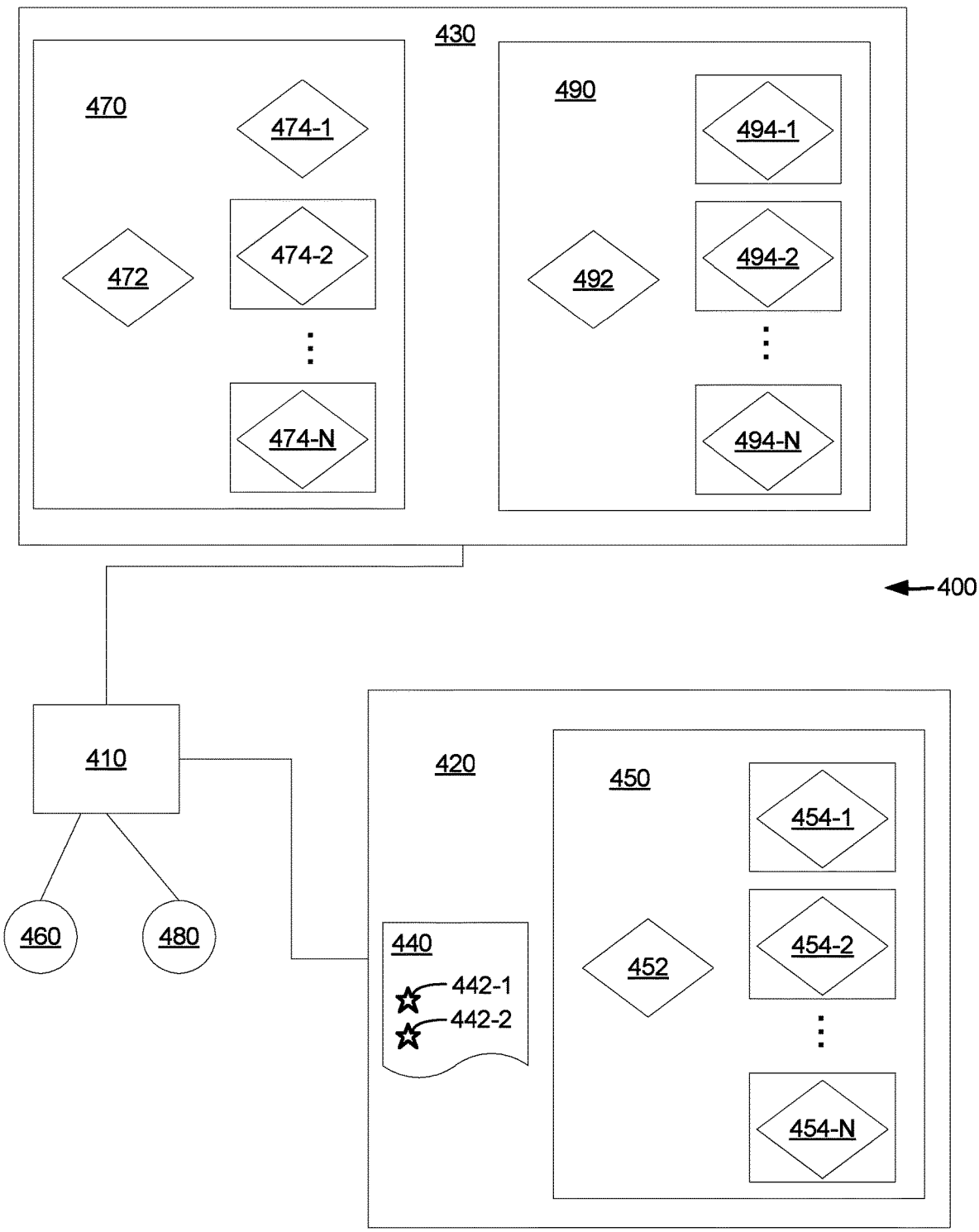
FIG. 4 depicts a system of heterogeneous encrypted software (HES) security (HESS) to secure one or more programs of a software payload, consistent with some embodiments of the disclosure.

FIG. 4 depicts a system 400 of heterogeneous encrypted software security (HESS) to secure one or more programs of a software payload, consistent with some embodiments of the disclosure. System 400 may be one or more components of a computing device that are performing operation of secure software executing. Computing device may be a client device, such as computer 100. System 400 may include a plurality of hardware including the following: a processor 410, a secondary memory 420, and a primary memory 430. System 400 may also include an input (not depicted) to receive commands for performing execution by the processor 410. For example, receiving a command from a first program or user to execute other programs or subroutines.

The secondary memory 420 may facilitate the storage or retention (either temporary or more permanently) of programs and executable code for providing to the processor 410 and the primary memory 430. In a first example, secondary memory 420 may be a storage device, such as a hard disk drive or solid-state storage device or other computer component configured to store one or more bits of data. Continuing the first example, primary memory 430 may be a random-access memory (RAM) and may receive data from the secondary memory 420. In a second example, secondary memory 420 be RAM and primary memory 430 may be one or more registers or caches of processor 410.

System 400 may be configured to receive and execute secure software. Specifically, system 400 may be configured to receive a license key (key) 440 and a copy of a heterogeneous program payload (payload) 450. The payload 450 may be provided by a separate computing device, such as a server or cloud computing environment 50. The payload 450 may be generated by the separate computing device before being provided to system 400. The key 440 may also be provided by a separate computing device before being received by system 400. The key 440 and the payload 450 may be stored in secondary storage 420 of system 400. The key 440 may include a set of one or more encrypted program attributes 442-1 and 442-2 (collectively, 442). The set of encrypted program attributes 442 may be an encrypted series of characters that contain a set of one or more program attributes (not depicted). The set of program attributes may be references, pointers, or other relevant program values. The payload 450 may include an unencrypted component 452 and a set of one or more encrypted components 454-1, 454-2, up to 454-N (collectively, 454). The payload 450 may be an executable file or archive. For example, payload 450 may be a binary file that is executable by processor 410 of system 400. In another example, payload 450 may be an executable archive that includes a plurality of files and folders (not depicted) for execution by processor 410.

The unencrypted component 452 may be executable and responsive to one or more commands, inputs, requests, and the like. In detail, unencrypted component 452 may be configured as a loader program code (loader) that is configured to receive program execution requests. The loader 452 may be configured to execute other portions of payload 450. The loader 452 may load, for example, other runtimes, libraries, code objects, and the like that are unencrypted. The loader 452 may also be configured to conditionally operate other portions of payload 450. Specifically, the loader 452 may only load or execute one or more of the encrypted components 454 indirectly. Specifically, the loader 452 may only decrypt a single encrypted component of the set of encrypted components 454, and upon a successful decryption a now decrypted component of the set of encrypted components 454 may launch automatically. Further, and for increased security, only certain encrypted components 454 may ever be decrypted and some encrypted components 454 may never be decrypted depending on the key 440. For example, any program, component, or feature (stored in a given encrypted component 454) that is not specified to be executed will not be decrypted by unencrypted component 452. In another example, any program, component, or feature (stored in a given encrypted component 454) that does not have a corresponding encrypted permission 442 in a given key 440, could never be decrypted by unencrypted component 452. In some circumstances, other systems or other keys (other than key 440) may be provided with a different set of encrypted attributes. The different set of encrypted attributes of another key may include program attributes that would permit execution of certain encrypted components 454. For example, if at a later time system 400 was provided with a new key that included additional encrypted attributes, an execution of the first copy of the payload 450 may permit execution of other programs, components, or features, stored in the encrypted components 454.

In a first example of operation, a first request 460 may be received by processor 410 of system 400. The processor 410 may receive the first request 460, and responsively may execute a first instance 470 of the payload 450. The first payload instance 470 may include a first instance of the unencrypted component 472 and the set of encrypted components 474-1, 474-2, up to 474-N (collectively, 474). The first request 460 may be directed to a first program of a set of programs, that are encrypted in the set of encrypted components 474. The first request 460 may be an execution request to the first program. The first payload instance 470 may also be configured to verify the validity of the key 440 (e.g., by being provided the key 440 as an argument on execution, or by retrieving the key 440 responsive to the first request 460). The request 460 may be in the form of input from a user through a graphical user interface (e.g., a click from a mouse on a menu) or a command line instruction. For example, the first request 460 may be directed to payload 450 that is a Java JAR file named "mySoftware.jar" with a key 440 named "myLicense.key" and requesting that a program 474-1 named "TextTyper" be executed. The first request 460 may appear as "java -jar mySoftware.jar -l myLicense.key -t TextTyper" in a command line.

Continuing the first example of operation, upon receiving request 460, processor 410 may execute first payload instance 470, and loader 472 may decrypt encrypted component 474-1 using key 440. The encrypted attributes 442 of key 440 may include encrypted binary values that specify which components the key can decrypt, and labels that characterize the protected functionality. The execution of program 474-1 may be secured from observation by the rest of system 410. In a first example, a homomorphic encryption technique may be employed. In a second example, first payload instance 470 may be sandboxed from other processes that execute in primary storage 430. In another example, the encrypted components 474 of the first payload instance 470 may include a first encrypted copy of a symmetric key (not depicted) and the key 440 may also include a second encrypted copy of the symmetric key. Any encrypted component 474 that does not receive a copy of the symmetric key that is encrypted in the key 440 may not execute. Consequently, a malicious program that intercepts the first instance of program 474-1 after decryption and while present in primary storage 430 may not be able to make a copy that is executable without also possessing a copy of the symmetric key.

In a second example of operation, a second request 480 may be received by processor 410. The processor 410 may receive the second request 480, and responsively may execute a second instance 490 of the payload 450. The second payload instance 490 may include a second instance of the unencrypted component 492 and the set of encrypted components 494-1, 494-2, up to 494-N (collectively, 494). The second request 480 may be directed to a second program of a set of programs, that are encrypted in the set of encrypted components 474. Specifically, the second program may be encrypted in encrypted component 494-2. The second request 480 may also be accompanied with the key 440. The key 440 may have a set of encrypted attributes but may not have an encrypted attribute that corresponds to the encrypted component 494-2.

Continuing the second example of operation, responsive to the request, the unencrypted component 492 may attempt to perform execution of a second program in the request 480. The unencrypted component 492 code may not include any logic to locate or perform access control or reveal any information about the encrypted components 494. For example, the second request 480 may be directed to a program named "PicturePainter" and may include key 440. The encrypted attributes 442 may correspond to programs that are not the "PicturePainter" program. Unencrypted component 492 may only contain code that executes a decryption routine using the provided key. The code may not reveal the unencrypted data of any component. All of the encrypted components 494 may remain encrypted based on this second example.

Figure 5:
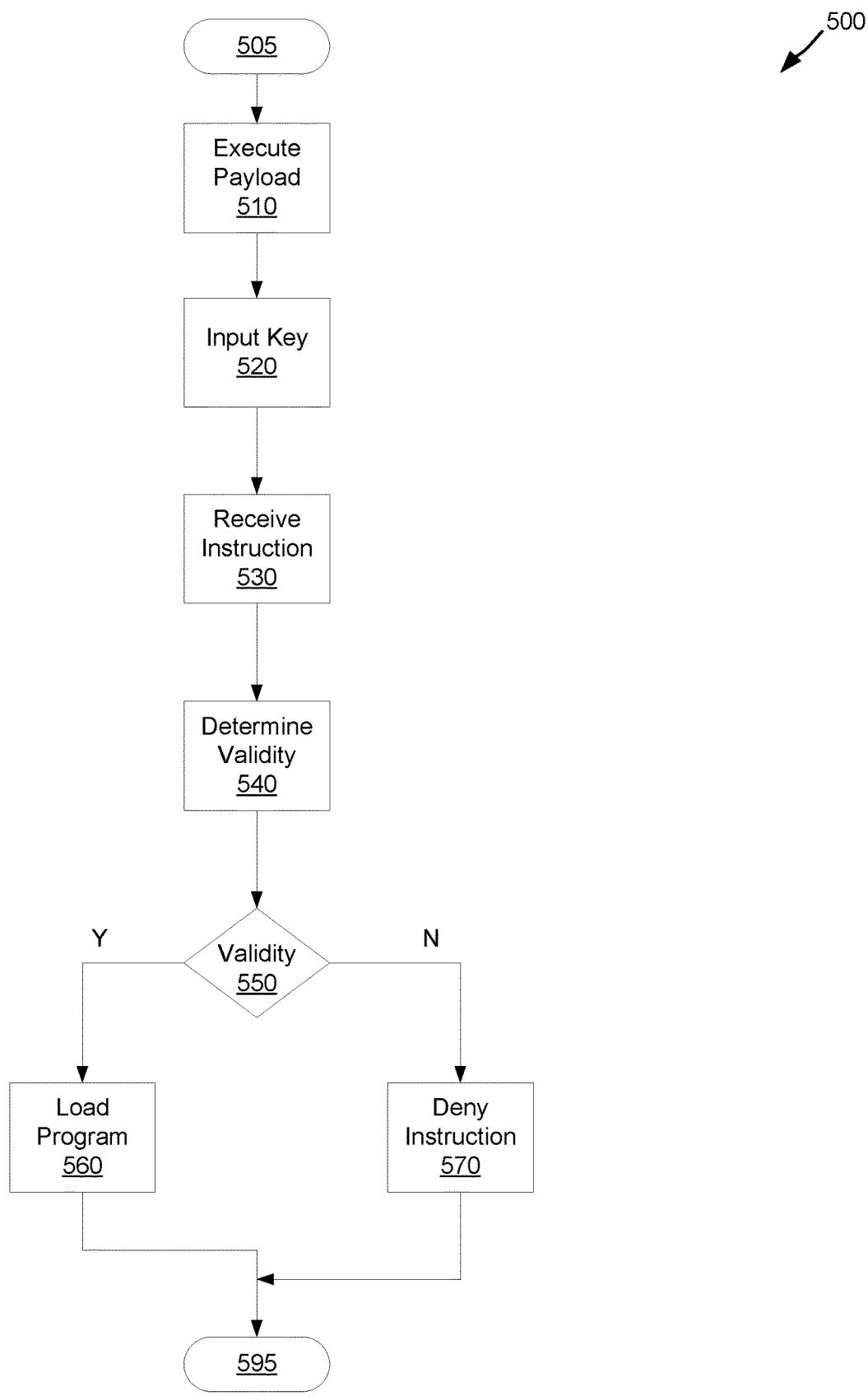
FIG. 5 depicts an example method of HES executed by a client system, consistent with some embodiments of the disclosure.

FIG. 5 depicts an example method 500 of HESS executed by a client system, consistent with some embodiments of the disclosure. Method 500 may be executed by a computer, such as computer system 100. Method 500 may be executed responsive to a user instructing a computer to execute secure software that is provided to the computer. For example, a memory stick may contain a copy of heterogeneous program payload (payload), such as payload 450. The computer that executes method 500 may be connected to a network, such as the Internet. In some embodiments, method 500 may be executed on an air-gapped computer. For example, a computer executing method 500 may be isolated from other computers, servers, and the like, or may otherwise not be communicatively coupled directly (or indirectly through a network) to any other processing devices.

Method 500 begins at 505, when a payload is executed at 510. The payload may be executed by receiving a command line argument to begin performing execution of the program.

The payload may be executed, at 510, periodically, such as by a batch process or script on a computer.

At 520, a license key may be input to the payload. In some embodiments, the key may be input as part of the execution of the payload at 510. For example, the license key may be a command line argument that is provided as part of the execution of the payload. In some embodiments, the key may be input after execution of the payload at 510. For example, the license key may be located locally on a storage device, in a logical folder, or other relevant computing construct. Upon execution of the payload 510, an unencrypted component, such as a verification and loading program, may begin by requesting that a license key be provided. Upon the request for the license key, a user or program may input the license key to the unencrypted component of the payload at 520.

A program execution instruction may be received at 530. The program execution instruction may be received by the payload 510. For example, the program execution instruction may be a selection from a script, user, or other program, to begin execution of a first program. The program execution instruction may be received at time of execution of the payload 510. For example, the program execution instruction may be an argument that is provided to the payload upon execution at 510. The program execution instruction may be directed at a portion of the payload. Specifically, the program execution instruction may refer by a program name or other relevant identifier, to one or more programs that are stored in a set of encrypted components of the payload.

At 540, a validity of execution of the payload may be performed. The validity of execution may be a validity of the key that was input at 520. The unencrypted component of the payload may receive the license key and may attempt to perform a decryption process with the license key (e.g., using a symmetric algorithm such as AES, or an asymmetric algorithm such as ABE). The validity of execution may be in response to a program execution instruction that was received at 530. The validity may be based on the license key and may further be based on the particular program instruction that was received at 530. Specifically, based on the license key, input at 520, and in combination with the program instruction, received at 530, the unencrypted component of the payload may begin by performing one or more decryption operations. The decryption operations may be performed against every encrypted component of the set of components. For example, the entire license key may be provided as an argument to a decryption process along with a plain-text identifier that corresponds to a targeted encrypted component of the set of encrypted components. The determination of validity may perform a decryption action of the decryption process to attempt to decrypt the identified program stored in an encrypted component of the set of components. The decryption process may attempt to perform a decryption action using each encrypted attribute that is in the license key. For example, a given license key may be a string of values that represents forty-five encrypted attributes that correspond to forty-five programs that may be executed by a corresponding heterogeneous program payload. The corresponding payload may contain seventy programs stored in seventy separate encrypted components. The decryption process may decrypt only a request program, from the receive program execution instruction at 530, if one of the forty-five encrypted attributes corresponds to the cryptographically matched encrypted component. The decryption process may be configured to receive the entire key without revealing any specific program attribute that corresponds to a program stored in an encrypted component.

For example, the decryption process may not reveal any unencrypted version of an encrypted attribute, and may not delineate, provide as output, or as an observable intermediate (e.g., in a primary storage, in a memory, or in a register of a processor) any unencrypted form of the encrypted attributes that form the license key.

If the validity is determined as valid, 550:Y, then the decrypted program may be loaded at 560. The decrypted program 560 may be the only program that is loaded. Stated another way, any encrypted component that is not the requested program does not get decrypted at 560. The decrypted program 560 may be loaded securely. For example, a processor may allocate a secure (e.g., sandboxed, private) portion of a RAM or cache for holding the decrypted program during execution.

If the validity is determined to be invalid, at 550:N, then the received program execution instruction is denied at 570. Denial at 570 may be an indication, output, or other message describing the denial. For example, a message may be generated that states "program access not permitted" to a file. In another example, a message may be generated that states "invalid input" to an output or screen buffer of a computer. Denial at 570 may include program termination of the unencrypted component of the heterogeneous program payload, without any communication of the reason for program termination.

After the validity is determined as valid at 550:Y, or after the validity is determined as invalid at 550:N, method 500 ends at 595.

Figure 6:
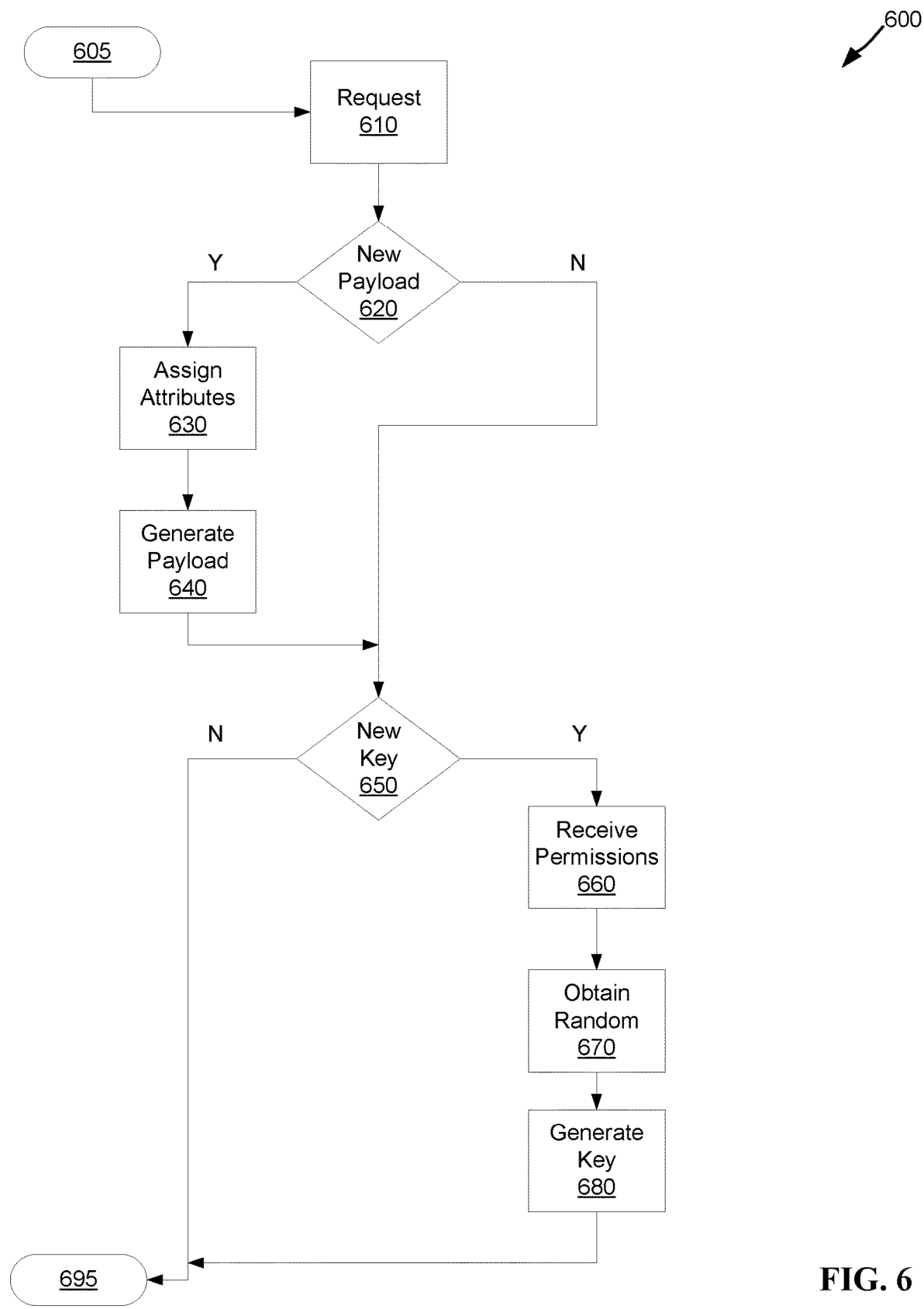
FIG. 6 depicts an example method for creation of components of an HES for providing to a client system, consistent with some embodiments of the disclosure.

FIG. 6 depicts an example method 600 for creation of components of a HESS for providing to a client system, consistent with some embodiments of the disclosure. Method 600 may be performed by a central computer, such as computer 100. Method 600 may be performed by a cloud provider, such as cloud computing environment 50. Method 600 may be performed by a software creator before distributing or otherwise providing software. For example, method 600 may be executed as part of an integrated development environment to generate a new version of software to correct a bug, or to expand or create new features.

From start 605, a request may be received at 610. The request may be input as part of a script for generating software or generating licenses to the software. The request at 610 may include one or more parameters such as build information, software version information, license names, client names, license permissions, or other relevant parameters. The request at 610 may include a reference to a software that is unsecured. For example, the request may include a pointer to a location of a set of one or more programs that are in an unencrypted format stored as a part of a binary, or as source code functions, or as one or more files and/or folders of a software archive file.

If the request is for a new payload at 620:Y, then a set of one or more program attributes may be assigned at 630. The assignment of attributes may include assigning a single attribute for every program of a software that is to be a part of the payload. Specifically, if a given piece of software has 135 distinct programs, then 135 program attributes may be assigned to the respective distinct programs. For example, if a developer is generating a new payload for distribution that includes four distinct programs, attributes "F1", "F2", "F3", and "F4" may be assigned to the first program, the second program, the third program, and the forth program, respectively.

At 640, a heterogeneous program payload may be generated. The program may be generated based on a first encryption process. The first encryption process may include the execution of an encryption algorithm that generates the heterogeneous program payload. For example, the payload could have been encrypted via symmetric encryption algorithms such as AES-128 or higher key length, or with asymmetric encryption algorithms such as RSA-2048 or ECDSA-224 or higher key length, or with attribute based encryption schemes such as KP-ABE or CP-ABE. The first encryption process may take, in any order, three inputs. The first encryption process may take as the first input, the unsecured payload that was part of the request (received at 610). The first encryption process may take as the second input, the assigned program attributes. The first encryption process may take as the third input, a primary key. The primary key may be a key, value, string, or other series of words or characters of sufficient length (e.g., 1024 bits).

The first encryption process may error out, or return an error code, if one or more of the inputs is incomplete or missing. For example, if an unsecured payload contains four programs and the first encryption process is given only three program attributes, the first encryption process may return an error. As part of generating the heterogeneous program payload, a set of one or more encrypted components may be generated (e.g., as a result or output of the first encryption process). As part of generating the heterogeneous program payload, at 640, an unsecured component may be combined with the encrypted components (e.g., substantially contemporaneous with, just before, or just after, the first encryption process creates the set of encrypted components). The unencrypted component may be combined with the set of encrypted components by compilation, grouping, archiving, embedding, or otherwise combining the unencrypted component and the set of encrypted components. The unencrypted component may be an output of the first encryption process. For example, as one output of the first encryption process a decryption process may be generated. The decryption process may take as input one or more of the program attributes, such as a subset of the program attributes (e.g., in an encrypted form).

If the request is not for a new payload at 620:N, and if the request is for a new key at 650:Y, one or more permissions for the key may be received at 660. The request (received at 610) for a new key, may include one or more permissions, references, values, or relevant identifiers of the programs that are to be permitted to be executed by a given heterogeneous program payload, and a reference to the given heterogeneous program payload. The one or more permissions may be an instance or first subset of the set of program attributes. For example, an entire set of program attributes may include thirty-five program attributes corresponding to each program that is stored (in an encrypted form) in a heterogeneous program payload. Continuing the example, the received permissions may include a subset of the program attributes, including the third program attribute, the twelfth program attribute, and the thirtieth program attribute. Next a random value may be obtained at 670. The random value may be a random string of characters. The random value may be a random series of words. The random value may be of a sufficient length or size (e.g., 256 bits).

A license key may be generated at 680. The license key may be generated by a second encryption process. The second encryption process may be a relevant encryption process. The second encryption process may include three inputs. The first input may be the subset of the program attributes (e.g., the program attributes that correspond to the programs that are to be permitted access to execution by the, to be generated, license key). The second input may be the random value. The third input may be the primary key. The output of the second encryption process may be the license key. The license key may be a series of values, string of characters, or other relevant cryptographic output. The license key may include a set of encrypted program attributes that correspond to the subset of encrypted components of the heterogeneous program payload that are permitted to be decrypted for execution. The license key may not delineate, separate, or otherwise indicate where a first encrypted program attribute ends and where a second encrypted program attribute ends. The use of the random value may ensure that encrypted program attributes are not discernable by comparing two keys. For example, given a first subset of program attributes, and a first random number, and the primary key, a license key generated at 680 may be a string with "skZIE"8'wBfbye-7[$$p7uNM2HLi>NZgOrAYFO&kjhlX{QQ=Oyrb#s<R−+8% h,X" values. Continuing the example, given the same first subset of program attributes, and a second random number, and the primary key, a license key generated at 680 may be a string with "HF,FQLb]46,x^/d?".QCd,=−?#sm.v:CT/xT(Oo<4BxE&LfThZ8*^zP(C?__nPA" values.

If the request is not for a new key at 650:N, or after generation of the license key at 680, method 600 ends at 695.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   generating, from a set of programs and based on a first encryption process with a primary key and with a set of program attributes, a heterogeneous program payload, the heterogeneous program payload containing an unencrypted component and a set of encrypted components, the set of encrypted components corresponding to a set of one or more programs, the unencrypted component of the heterogeneous program payload including loader program code configured to receive a first license key, wherein the set of program attributes correspond to the set of programs, wherein each program attribute of the set of program attributes identifies a corresponding program of the set of programs, the loader program code configured to, in response to receiving the first license key, perform a decryption action against the set of encrypted components of the heterogeneous program payload, the result of the decryption action dependent on encrypted program attributes in the first license key;
   providing, to a first computing device, a first copy of the heterogeneous program payload;
   generating, based on a second encryption process with the primary key and with a first subset of the set of program attributes, the first license key, wherein the first license key contains a first set of one or more encrypted program attributes that correspond to a first subset of the set of encrypted components.

2. The method of claim 1, wherein:
the first subset of the set of program attributes is the same as the set of program attributes, and
the first subset of the set of encrypted components is the same as the set of encrypted components.

3. The method of claim 1, wherein a first encrypted component of the of encrypted components is a first program, and wherein a second encrypted component of the encrypted components is a feature of the first program.

4. The method of claim 1, wherein the method further comprises:
providing, to the first computing device, the first license key.

5. The method of claim 4, wherein the loader program code is further configured to:
receive a first program execution instruction, the first program execution instruction directed to a first program encrypted in a first component of the encrypted components.

6. The method of claim 5, wherein the decryption action comprises:
determining, by the loader program code, an invalidity of the first license key; and
denying, by the loader program code and in response to the invalidity, the first program execution instruction.

7. The method of claim 5, wherein the decryption action comprises:
determining, by the loader program code, a validity of the first license key; and
loading, by the loader program code and in response to the validity and based on the first program execution instruction, the first program into memory for execution by a processor.

8. The method of claim 7, wherein the method further comprises:
providing, to a second computing device, a second license key, wherein:
the second license key contains a second set of one or more encrypted program attributes that correspond to the first subset of the one or more encrypted components, and
the second set of one or more encrypted program attributes are not the same as the first subset of the one or more encrypted program attributes; and
providing, to the second computing device, a second copy of the heterogeneous program payload.

9. The method of claim 8, wherein the loader program code of the second copy of the heterogeneous program payload configured to:
receive a second program execution instruction, the second program execution instruction directed to the first program encrypted in the first encrypted component of the set of encrypted components of the second copy of the heterogeneous program payload;
receive the second license key;
determine a second invalidity of the second license key; and
deny, in response to the second invalidity, the second program execution instruction.

10. The method of claim 8, wherein the loader program code of the second copy of the second copy of the heterogeneous program payload configured to:

receive a second program execution instruction, the second program execution instruction directed to the first program encrypted in the first encrypted component of the set of encrypted components of the second copy of the heterogeneous program payload;
receive the second license key:
determine a validity of the second license key; and
load, in response to the validity and based on the second program execution instruction, the first program into memory for execution by a processor.

11. A system, the system comprising:
a memory, the memory containing one or more instructions; and
a processor, the processor communicatively coupled to the memory, the processor, in response to reading the one or more instructions, configured to:
generating, from a set of programs and based on a first encryption process with a primary key and with a set of program attributes, a heterogeneous program payload, the heterogeneous program payload containing an unencrypted component and a set of encrypted components, the set of encrypted components corresponding to a set of one or more programs, the unencrypted component of the heterogeneous program payload including loader program code configured to receive a first license key, wherein the set of program attributes correspond to the set of programs, wherein each program attribute of the set of program attributes identifies a corresponding program of the set of programs, the loader program code configured to, in response to receiving the first license key, perform a decryption action against the set of encrypted components of the heterogeneous program payload, the result of the decryption action dependent on encrypted program attributes in the first license key;
provide, to a first computing device, a first copy of the heterogeneous program payload;
generating, based on a second encryption process with the primary key and with a first subset of the set of program attributes, the first license key, wherein the first license key contains a first set of one or more encrypted program attributes that correspond to a first subset of the set of encrypted components.

12. The system of claim 11, wherein the processor is further configured to:
provide the first license key to the first computing device.

13. The system of claim 12, wherein the loader program code is further configured to:
receive a first program execution instruction, the first program execution instruction directed to a first program encrypted in a first component of the encrypted components.

14. The system of claim 13, wherein the decryption action comprises:
determining, by the loader program code, an invalidity of the first license key; and
denying, by the loader program code and in response to the invalidity, the first program execution instruction.

15. A computer program product, the computer program product comprising:
one or more computer readable storage media; and
program instructions collectively stored on the one or more computer readable storage media, the program instructions executable by one or more processors to cause the one or more processors to:

generate, from a set of programs and based on a first encryption process with a primary key and with a set of program attributes, a heterogeneous program payload, the heterogeneous program payload containing an unencrypted component and a set of encrypted components, the set of encrypted components corresponding to a set of one or more programs, the unencrypted component of the heterogeneous program payload including loader program code configured to receive a first license key, wherein the set of program attributes correspond to the set of programs, wherein each program attribute of the set of program attributes identifies a corresponding program of the set of programs, the loader program code configured to, in response to receiving the first license key, perform a decryption action against the set of encrypted components of the heterogeneous program payload, the result of the decryption action dependent on encrypted program attributes in the first license key;

provide, to a first computing device, a first copy of the heterogeneous program payload;

generate, based on a second encryption process with the primary key and with a first subset of the set of program attributes, the first license key, wherein the first license key contains a first set of one or more encrypted program attributes that correspond to a first subset of the set of encrypted components.

16. The computer program product of claim 15, wherein:
the first subset of the set of program attributes is the same as the set of program attributes, and
the first subset of the set of encrypted components is the same as the set of encrypted components.

17. The computer program product of claim 15, wherein a first encrypted component of the of encrypted components is a first program, and wherein a second encrypted component of the encrypted components is a feature of the first program.

18. The computer program product of claim 15, wherein the program instructions are further executable by one or more processors to cause the one or more processors to provide, to the first computing device, the first license key.

19. The computer program product of claim 18, wherein the loader program code is further configured to receive a first program execution instruction, the first program execution instruction directed to a first program encrypted in a first component of the encrypted components.

20. The computer program product of claim 19, wherein the decryption action comprises:
determining, by the loader program code, an invalidity of the first license key; and
denying, by the loader program code and in response to the invalidity, the first program execution instruction.

* * * * *